United States Patent Office 3,547,668
Patented Dec. 15, 1970

1

3,547,668
PROCESS FOR THE PRODUCTION OF CELLULOSE TRIACETATE FILMS
Kingo Kobayashi and Goro Uehara, Kanagawa, Japan, assignors to Fuji Shashin Film Kabushiki Kaisha, Kanagawa, Japan
No Drawing. Filed Oct. 16, 1967, Ser. No. 675,332
Claims priority, application Japan, Oct. 18, 1966, 41/68,528
Int. Cl. C08b 3/22
U.S. Cl. 106—189     4 Claims

ABSTRACT OF THE DISCLOSURE

In a process for the production of a cellulose triacetate film by a dry solution method using as the solvent a mixed solvent of at least one hydrocarbon chloride having from 1 to 2 carbon atoms, and a member selected from the group consisting of an alkanol having 3 to 6 carbon atoms, benzene, toluene, cyclohexane and mixture thereof the improvement which comprises subjecting the solution to a shearing treatment, adequate to reduce the viscosity, prior to casting of the solution.

BACKGROUND OF THE INVENTION

Field of the invention

The present invention relates to a process for the production of cellulose triacetate films by a dry solution method and more particularly it relates to a process for the production of cellulose triacetate films unaccompanied by troubles caused by the increase in the viscosity of a solvent solution of cellulose triacetate.

Description of the prior art

Hitherto, a process for producing a film of cellulose triacetate by a solution process has been carried out in such manner that cellulose triacetate containing 56 percent or more of combined acetic acid is dissolved in a mixed solvent of a lower hydrocarbon chloride, e.g., methylene chloride, and a lower aliphatic alcohol, e.g., methanol. An appropriate plasticizer is added to the resultant mixture and, after treating the mixture in purification steps, such as filtration, de-aeration, and adjustment of concentration, viscosity and temperature, the mixture is supplied to a film casting machine.

As the solvent used in the aforesaid process there has most frequently been used a mixed solvent of methylene chloride and less than about 10% by weight methanol. This mixed solvent is superior in various industrial viewpoints of solubility, solution stability, price, solvent recovery, composition stability and incombustibility.

On the other hand, in consequence of the above superior solubility and stability, it has disadvantages in film forming procedures. The term "film forming procedure," as used herein, means that the above purified solution is extruded into a film form on a moving support by means of an appropriate casting apparatus. Generally, this procedure is called a casting operation and as the movable support, the surface of a rotating drum or endless belt is used. Solvent is evaporated out of the film thus formed during one rotation of the support.

Then, a coagulated, product film is peeled from the surface of the support and fed into an appropriate dryer, where residual solvent is evaporated from the peeled film.

Therefore, in order to enhance the film forming rate and to obtain an industrial advantage, coagulation and peeling of the cast film must be carried out in a short time. The mixed solvent of methylene chloride and methanol, in consequence of superior solubility and stability, is rather unsatisfactory with respect to the rate of coagulation and peeling.

So, recently, a mixed solvent, containing poor solvents has come to be used and, thereby, the rate of coagulation and peeling is improved. Further, mixed solvents are also recognized as having an effect on improving the mechanical strength of the dried film.

A mixed solvent used for above object contains a main solvent of a lower hydrocarbon chloride, having usually one or two carbon atoms, and a mixed poor solvent of at least one of methanol or ethanol, and at least one alcohol having three to six carbon atoms or an aromatic compound, e.g., benzol, toluene, cyclohexane, or the like.

In the dissolving step in which cellulose triacetate is dissolved into the above mixed solvent containing a poor solvent, it is very difficult, compared with the use of the mixed solvent of methylene chloride and methanol, to obtain a transparent solution free from insoluble particles. This is a well known fact. In other words, the solubility of the cellulose triacetate in the solvents is unsatisfactory.

Further, to make the matter worse, this solution is unstable. Namely, the inventors discovered that the solution increases rapidly in viscosity in the elapse of time in the steps of resolution, purification and film casting. This phenomenon is disadvantageous industrially in the case of adopting this solvent.

A solution of cellulose ester is different from viscose, and some kinds of fused thermoplastic resin and has the great feature that the solution is almost free from a change in its properties with the elapse of time. But, an increasing viscosity of solution with the elapse of time makes it very difficult to carry out the procedures of solution, purification and film forming. In an attempt to settle the above problems, it is proposed that the time of solution stagnation, from the dissolving step to the film forming step, should sufficiently be minimized. But, this causes great difficulty and is a disadvantage in view of the requirements of industrial practice. Further, this is not a measure that relieves the occurrence of the increased viscosity.

An object of the present invention is to provide a process of producing cellulose triacetate films using a solution of cellulose triacetate containing poor solvents and to prevent the increase in viscosity with the elapse of time, and further to return the increased viscosity, after the elapse of time, to its original value.

SUMMARY OF THE INVENTION

The inventors discovered that an increased viscosity with the elapse of time proceeds as long as the solution is kept in an unstirred condition, and if stopped if it is kept under shearing conditions. It was further discovered that the occurrence of increased viscosity could be depressed and the viscosity returned to its initial value, if a shearing treatment is applied to the solution.

The present invention relates to a process for producing a film of cellulose triacetate by a solution process of dry casting which comprises the use of a mixed solvent consisting of a hydrocarbon chloride, having one or two carbon atoms, and at least one alcohol having three to six carbon atoms or aromatic compound, e.g., benzol, toluene, cyclohexane or the like, whereby a satisfactory shearing treatment is included in the steps of resolution and purification in order to prevent the increase in viscosity with the elapse of time in the above solution or return the viscosity to its original value.

A strong shearing treatment of the solution is preferably selected to obtain the effect of the present invention and further is desirable from the viewpoint of other industrial advantages, e.g., promotion of homogeneity of the solution.

But, high power and large scale equipment is required to provide strong shearing conditions and substantial heat is generated in the solution. This is not advantageous. Particularly, in the case of treating a solution which exhibits a remarkable increase in viscosity, the shearing treatment is desirably given so that it is gradually raised from a low degree of shearing.

The above shearing treatment may be carried out by various processes. For example, conventional processes, such as fluid flow in piping, or agitation in a tank, may be utilized for the purpose.

Examples in which a solution containing the said poor solvent was employed and the increase in viscosity with the elapse of time was reduced to the original value by the process in the invention are set forth and illustrated below.

Example I 100 parts of cellulose triacetate having a polymerization degree of 250 and an amount of combined acetic acid of 61.5 percent was used. Cellulose triacetate of the same properties was also used in the other examples. The cellulose triacetate was mixed with 15 parts of triphenylphosphate, 461 parts of methylene chloride, 26 parts of ethanol, and 37 parts of n-butanol. The materials were dissolved in each other and purified. The temperature of the solution was kept at 16° C.

The viscosity of the solution was 375 poises immediately after the components were dissolved and 1,320 poises after the elapse of 7 days, under unstirred conditions.

Further, the viscosity was 450 poises for a solution which was kept under unstirred conditions for 7 days and then had been agitated.

Example II 100 parts of cellulose triacetate, 15 parts of triphenylphosphate, 400 parts of methylene chloride, 14 parts of mehtanol and 46 parts of n-butanol were dissolved in each other and purified. The temperature of the solution was kept at 17° C.

The viscosity of the solution showed 726 poises immediately after the components were dissolved and 5,770 poises after the elapse of 72 hours under unstirred conditions.

Further, the viscosity was 8,800 poises after the elapse of 144 hours under unstirred conditions. Then, it was 900 poises for a solution which was kept under unstirred conditions for 144 hours, and then had been agitated.

Example III 100 parts of cellulose triacetate, 15 parts of triphenylphosphate, 377 parts of methylene chloride, 46 parts of methanol and 37 parts of cyclohexane were dissolved in each other and purified. The temperature of the solution was kept at 18° C. The viscosity of the solution was 302 poises immediately after the components were dissolved, and 473 poises atfer the elapse of 28 hours under unstirred conditions. It was 620 poises and 687 poises for a solution which was held for 54 hours and 78 hours, respectively, under unstirred conditions. Further, it was 330 poises for a solution which was kept under unstirred conditions for 78 hours and then had been agitated.

Referring to the above examples, it is disclosed that an increase in the viscosity of the solution with the elapse of time is in the range of 2 to 20 multiples, compared with the viscosity immediately after dissolution. But if a shearing treatment is given to a solution having increased viscosity, its viscosity can be depressed and returned to the range of about 10 to 20 percent higher than the viscosity immediately after resolution.

A comparison example in which a conventional mixed solvent of methylene chloride and methanol was employed for this solution is set forth below.

Comparison example.—100 parts of cellulose triacetate, 15 parts of triphenylphosphate, 423 parts of methylene chloride and 37 parts of methanol were dissolved in each other and purified. The temperature of the solution was ketp at 16.5° C.

The viscosity of the solution was 742 poises, immediately after the components were dissolved, and, further, was 907 poises for a solution which was kept under unstirred conditions for 72 hours.

In order to suppress an increase in viscosity of the solution in the lapse of time or return the viscosity to its initial value, the process of the present invention may be carried out to an adequate degree at an optional time, in so far as the scope of the rate of viscosity increase allows and in conformity with the nature of the composition of the solvent, the temperature conditions, and the requirement of other necessary operations.

An instance of returning an increased viscosity to its original value alone was described in the above examples, but the process in the present invention can show a similar effect for the suppression of an increase in viscosity with the elapse of time. This can be understood satisfactorily from the preceding examples.

Further, cellulose triacetate having particular properties, a specific composition of plasticizer, a composition of several solvents, and the conditions of treatment were described in the preceding examples, but the process of the present invention, is not limited thereby.

According to the process of the present invention, an increase in viscosity with the elapse of time, for a cellulose triacetate solution which contains poor solvents, can be easily suppressed or restored. So, the period of solution stagnation can be prolonged without causing any difficulty from the step of resolution to the step of casting.

Further, according to the process of the present invention, a partial lack of homogeneity in the viscosity of the solution can be controlled at the time of the casting step.

To maintain the homogeneity of the viscosity of the casting solution is an indispensable element to obtain a film product which has even thickness and superior flatness. Consequently, the process of the present invention is particularly suitable for producing a film for use as a photographic film base which requires superior quality in the above respects.

What is claimed is:

1. In a process for the production of a cellulose triacetate film by a dry solution method, which method comprising dissolving cellulose triacetate in a mixed solvent comprising (1) at least one hydrocarbon chloride having from 1 to 2 carbon atoms and (2) a member selected from the group consisting of an alkanol having from 3 to 6 carbon atoms, benzene, toluene cyclohexane and mixtures thereof, purifying the resulting solvent solution and casting the purified solution to form said film, the improvement which comprises, prior to casting the purified solution, reducing the viscosity of said purified solvent solution, the viscosity of which has been increased 2 to 20 multiples, compared with the viscosity immediately after dissolution, due to the passage of time by subjecting said purified solution to a shearing treatment, whereby the viscosity thereof is reduced to a value which is in a range of 10 to 20% higher than the viscosity immediately after the components were dissolved.

2. The process as claimed in claim 1 wherein said shearing action is provided by stirring.

3. The process as claimed in claim 1 wherein said hydrocarbon chloride is selected from the group consisting of methylene chloride and ethylene chloride.

4. The process as claimed in claim 1 wherein said mixed solvent additionally contains a member selected from the group consisting of methanol and ethanol.

References Cited

UNITED STATES PATENTS

| | | | |
|---|---|---|---|
| 2,607,704 | 8/1952 | Fordyce et al. | 106—191 |
| 2,858,228 | 10/1968 | Hughes | 105—190 |
| 2,858,229 | 10/1968 | Hughes | 106—190 |
| 2,925,353 | 2/1960 | Mika et al. | 106—196 |

DONALD E. CJAJA, Primary Examiner

R. W. GRIFFIN, Assistant Examiner

U.S. Cl. X.R.

106—190, 191, 196; 260—230